US006172172B1

(12) United States Patent
Burgin et al.

(10) Patent No.: US 6,172,172 B1
(45) Date of Patent: Jan. 9, 2001

(54) POLYOLEFIN COMPOSITIONS AND BLOWN FILMS OBTAINED THEREFROM

(75) Inventors: Emanuele Burgin, Zola Predosa; Gianni Perdomi, Ferrara; Claudio Cometto, Bologna, all of (IT)

(73) Assignee: Montell Technology Company BV, Hoofddorp (NL)

( * ) Notice: Under 35 U.S.C. 154(b), the term of this patent shall be extended for 0 days.

(21) Appl. No.: 09/437,383

(22) Filed: Nov. 10, 1999

Related U.S. Application Data

(63) Continuation of application No. 08/753,779, filed on Dec. 2, 1996, now abandoned.

(30) Foreign Application Priority Data

Dec. 1, 1995 (IT) .............................................. MI95A2526

(51) Int. Cl.[7] ............................ C08F 10/04; C08F 10/14; C08L 23/08; C08L 23/10
(52) U.S. Cl. ........................................ 526/348.1; 525/240
(58) Field of Search ........................... 525/240; 526/348.1

(56) References Cited

U.S. PATENT DOCUMENTS

| 4,916,198 | * | 4/1990 | Scheve et al. ....................... 526/351 |
| 5,286,564 | * | 2/1994 | Cecchin et al. ..................... 428/402 |

* cited by examiner

Primary Examiner—David W. Wu
Assistant Examiner—R. Rabago
(74) Attorney, Agent, or Firm—Bryan Cave LLP

(57) ABSTRACT

Polyolefin compositions obtained by mixing:
(A) A heterogeneous polyolefin composition itself comprising a fraction (A1) which is insoluble in xylene and a fraction (A2) which is soluble in xylene;
(B) a polyolefin composition comprising a low density ethylene copolymer (B1) and a propylene copolymer (B2) of relatively high insolubility in xylene; and, optionally,
(C) a branched propylene polymer.

The films obtained with the said compositions show improved mechanical properties and impact strength when compared with polyethylene-based films.

21 Claims, No Drawings

POLYOLEFIN COMPOSITIONS AND BLOWN FILMS OBTAINED THEREFROM

This is a continuation of U.S. application Ser. No. 08/753,779, filed, Dec. 2, 1996 now abandoned.

The present invention relates to polyolefin compositions which are particularly suitable for use in the preparation of blown films with improved mechanical properties. In particular, the present invention relates to a polyolefin composition obtained by mixing:

(A) a heterogeneous polyolefin composition itself comprising a fraction (A1) which is insoluble in xylene and a fraction (A2) which is soluble in xylene;

(B) a polyolefin composition comprising a low density ethylene copolymer (B1) and a propylene copolymer (B2) of relatively high insolubility in xylene; and, optionally, (C) a branched propylene polymer.

The blown films sector constitutes an area of everincreasing importance in the field of polyolefin films. The reason for this is that the films obtained by blowing have a tubular shape which makes them particularly advantageous in the production of bags for a wide variety of uses (bags for urban refuse, bags used in the storage of industrial materials, for frozen foods, carrier bags, etc.) as the tubular structure enables the number of welding joints required for formation of the bag to be reduced when compared with the use of flat films, with consequent simplification of the process. Moreover, the versatility of the blown-film technique makes it possible, simply by varying the air-insufflation parameters, to obtain tubular films of various sizes.

The polyolefin material mainly used in the production of blown films is polyethylene, understood as LDPE, LLDPE or mixtures thereof, since they are endowed with properties in the molten state which enable films to be obtained with a high level of production efficiency, and in a very wide thickness range, without compromising the stability of the bubble.

In contrast with these excellent properties of processability, polyethylene-based films have mechanical properties that are not as good, thereby making it necessary in certain particular applications such as, for example, bags used to store industrial materials, to use quite thick (180–200μ) tubular films with a consequent increase in costs. This is because lower thicknesses would not allow the bags to be filled with materials at temperatures above room temperature without undergoing deformations which would compromise the stability of stacks made of bags placed one on top of another. The same problem of stability may be encountered in storage during summer, when room temperatures may be high enough to lead to deformation of the bags.

The use in these applications of blown films obtained from polypropylene-based polymers, on the other hand, is particularly difficult given the poor processability properties of polypropylene which give rise to frequent tearing of the bubble or, in any case, to excessive orientation of the film, resulting in an impact strength which is so low as to render it unusable in certain applications.

It is therefore seen that there is a need for a polyolefin material which at the same time is of good processability on blown-film production lines and is capable of providing films with mechanical properties that are such as to allow a reduction of thickness when compared with polyethylene-based films.

It has now been found, surprisingly, that polyolefin compositions obtained by mixing:

(A) a polyolefin composition having:
(A1) a fraction which is insoluble in xylene at room temperature, comprising a propylene polymer, and
(A2) a fraction which is soluble in xylene at room temperature, comprising an ethylene copolymer; and
(B) a polyolefin composition comprising:
(B1) an LLDPE; and
(B2) a propylene copolymer of defined insolubility characteristics in xylene; and, optionally
(C) a propylene polymer with a branching number of less than 1, provide blown films with improved mechanical properties when compared with polyethylene-based films, the films provided conserving, at the same time, good processability.

A subject of the present invention thus consists of a polyolefin composition obtained by mixing: from 50 to 95% by weight of a heterogeneous polyolefin composition (A) having:

(A1) from 20 to 90 parts by weight of a fraction which is insoluble in xylene at room temperature, comprising a propylene homopolymer and/or a copolymer of propylene with ethylene and/or another α-olefin $CH_2=CHR'$, where $R'$ is an alkyl radical having 2–10 carbon atoms, this fraction containing more than 85% by weight of units derived from propylene; and (A2) from 5 to 80 parts by weight of a fraction which is soluble in xylene at room temperature, comprising an amorphous copolymer of ethylene with propylene and/or another α-olefin $CH_2=CHR'$, where $R'$ has the meaning described above, this fraction optionally containing smaller proportions of a diene and containing more than 15% by weight of units derived from ethylene;

from 5 to 50% by weight of a polyolefin composition (B) comprising:

(B1) from 80 to 110 parts by weight of a copolymer of ethylene with one or more α-olefins $CH_2=CHR$, where R is an alkyl radical having from 1 to 10 carbon atoms, the said ethylene copolymer having a density of between 0.88 and 0.945 g/cm$^3$, a melt index of from 0.1 to 10 g/10' and containing up to 20 mol % of α-olefin $CH_2=CHR$;

(B2) from 5 to 30 parts by weight of a copolymer of propylene with ethylene and/or one or more α-olefins $CH_2=CHR'$, where $R'$ is a hydrocarbon radical having from 2 to 10 carbon atoms, the said propylene copolymer containing from 60 to 98% by weight of propylene and having an insolubility in xylene of greater than 70%; and, optionally from 1 to 30% by weight of a component (C) comprising a propylene polymer with a branching number of less than 1.

The heterogeneous polyolefin composition (A) may conveniently be prepared by sequential polymerization, working in at least two stages; in a first stage, a crystalline propylene homopolymer and/or copolymer with an isotactic index of greater than 85 is prepared, and, in a second stage, mixtures of ethylene, propylene and/or an α-olefin $CH_2=CHR'$ are polymerized to give a predominantly amorphous copolymer. The composition (A) is preferably present in amounts ranging from 60 to 90%, more preferably from 75 to 85%, by weight relative to the total of (A)+(B).

The fraction (A1) which is insoluble in xylene preferably comprises a propylene homopolymer and/or a copolymer of propylene, preferably with ethylene and/or another α-olefin $CH_2=CHR'$, where $R'$ has the meaning described above, this fraction containing more than 90% by weight of units derived from propylene. The amount of fraction (A1) is preferably between 30 and 85 parts by weight, more preferably between 45 and 70 parts by weight.

The fraction (A2) which is soluble in xylene preferably comprises a copolymer of ethylene with propylene, this fraction optionally containing smaller proportions of a diene and containing more than 20% by weight of units derived from ethylene and preferably having an intrinsic viscosity of between 1.5 and 4 dl/g. The amount of fraction (A2) which is soluble in xylene is preferably between 10 and 70, more preferably between 10 and 40, parts by weight.

Examples of heterogeneous polyolefin compositions and methods for preparing them are described in U.S. Pat. No. 4,521,566, EP-A-400,333 and EP-A-472,946, the description of which is incorporated herein by way of reference.

The copolymer (B1) is preferably present in amounts of between 80 and 95 parts by weight and has a density preferably of between 0.89 and 0.94 g/cm$^3$. These values are more preferably between 0.90 and 0.935.

The melt index (determined according to ASTM method D-1238, condition E) of the copolymer (B1) has values generally of between 0.1 and 10 g/10 minutes, preferably of between 0.2 and 3 g/10 minutes, more preferably of between 0.2 and 1 g/10 minutes.

The α-olefin $CH_2$=CHR may be chosen, for example, from propylene, 1-butene, 1-hexene, 1-octene and 4-methyl-1-pentene; 1-butene or 1-hexene is preferably used. In the preparation of the component (B1), the olefins $CH_2$=CHR may also be used mixed together.

The copolymer (B2) may be, for example, a propylene/ethylene, propylene/butene or propylene/hexene copolymer. It is preferably a terpolymer of propylene with ethylene and an α-olefin $CH_2$=CHR$^I$. In this case, its propylene content is between 85 and 96% by weight, the ethylene content is between 2 and 8% by weight and the α-olefin $CH_2$=CHR$^I$ content is between 2 and 7% by weight. The content of the various components is determined by IR and NMR analysis.

The α-olefin $CH_2$=CHR$^I$ may be chosen, for example, from 1-butene, 1-hexene, 1-octene and 4-methyl-1-pentene, and is preferably 1-butene or 1-hexene.

The high insolubility in xylene is indicative of a stereoregular structure of the propylene units and of homogeneous distribution of the ethylene units and of the α-olefin $CH_2$=CHR$^I$ in the polymer chains.

The insolubility in xylene, determined according to the method described below, is preferably greater than 75%, more preferably greater than 85%. The heat of fusion of the copolymer (B) is generally greater than 50 J/g, preferably greater than 60 J/g, more preferably greater than 70 J/g. The melting point of the copolymer (B2) is below 140° C. and preferably between 120 and 140° C.

The crystalline index of the copolymer (B2) is generally greater than 50%.

The melt index (determined according to ASTM method D-1238, condition L) of the copolymer (B2) has values generally of between 5 and 1000, preferably of between 5 and 100, more preferably of between 5 and 30.

The copolymer (B2) is preferably used in amounts of between 5 and 20 parts by weight.

A particularly preferred aspect of the invention consists of polyolefin compositions obtained by mixing (A) and (B) as described above, in which the composition (A) is obtained by mixing:

(A') a first heterogeneous polyolefin composition having:
  (A'1) 75–95% by weight of a fraction which is insoluble in xylene at room temperature, comprising a propylene homopolymer or a copolymer of propylene with ethylene and/or another α-olefin $CH_2$=CHR$^I$, where R$^I$ is an alkyl radical having 2–10 carbon atoms, this fraction containing more than 85% by weight of units derived from propylene; and
  (A'2) from 5 to 25% by weight of a fraction which is soluble in xylene at room temperature, comprising an amorphous copolymer of ethylene with propylene and/or another α-olefin $CH_2$=CHR$^I$, where R$^I$ has the meaning described above, this fraction optionally containing smaller proportions of a diene and containing more than 15% by weight of units derived from ethylene; and (A") a second heterogeneous polyolefin composition comprising:
  (A"1) from 30 to 75% by weight of a fraction which is insoluble in xylene at room temperature, comprising a propylene homopolymer or a copolymer of propylene with ethylene and/or another α-olefin $CH_2$=CHR$^I$, where R$^I$ is an alkyl radical having 2–10 carbon atoms, this fraction containing more than 85% by weight of units derived from propylene; and
  (A"2) from 25 to 70% by weight of a fraction which is soluble in xylene at room temperature, comprising an amorphous copolymer of ethylene with propylene and/or another α-olefin $CH_2$=CHR$^I$, where R$^I$ has the meaning described above, this fraction optionally containing smaller proportions of a diene and containing more than 15%, preferably between 15 and 40%, by weight of units derived from ethylene; the total of (A'1) and (A"1) being between 20 and 90 parts by weight while the total of (A'2) and (A"2) is between 10 and 80 parts by weight.

The heterogeneous compositions (A') and (A") may be prepared as described above for the composition (A). Examples of heterogeneous polyolefin compositions (A') and methods for preparing them are described in U.S. Pat. No. 4,521,566 already mentioned, while examples of heterogeneous polyolefin compositions (A") and methods for preparing them are described in EP-A-400,333 and EP-A-472,946 already mentioned.

The polyolefin composition (B) used in the films of the present invention may be obtained by mechanical mixing of the two components (B1) and (B2) in the molten state, for example in a mixer with high mixing efficiency or, alternatively, directly in the extruder.

The composition comprising the components (B1) and (B2) is preferably prepared directly by polymerization working in at least two reactors in series in which, working in any order and using the same catalyst in the various reactors, copolymer (B1) is synthesized in one of the reactors and copolymer (B2) is synthesized in the other. The polymerization is conveniently carried out in the gas phase using fluidized-bed reactors. Examples of products prepared according to this methodology are described in International patent applications WO 93/03078 and WO 95/20009, the descriptions of which are included herein by way of reference.

The component (C) optionally present in the films of the invention may be any propylene polymer having a branching number of less than 1, preferably of between 0.1 and 0.9 and more preferably of between 0.2 and 0.7. Generally, the said polymers have a melt strength of between 5 and 40 cN, preferably of between 10 and 35 cN and more preferably of between 15 and 30 cN.

The term "propylene polymer" used in reference to the component (C) of the present invention comprises a propylene homopolymer or propylene copolymers containing up to 40% by weight, preferably between 1 and 30%, more preferably between 2 and 20%, of ethylene and/or another α-olefin $CH_2$=CHR$^I$, where R$^I$ has the meaning described above.

The branching number (g) of the component (C) of the present invention is defined by the ratio $[\eta]_{Br}/[\eta]_{Lin}$ where $[\eta]_{Br}$ and $[\eta]_{Lin}$ are, respectively, the intrinsic viscosity (determined in tetrahydronaphthalene (THN) at 135° C.) of a branched polymer and of a corresponding linear polymer having the same molecular weight (Mw).

The branched propylene polymer which constitutes the component (C) of the present invention may be prepared by many techniques, starting from the corresponding linear polymers. In particular, it may be prepared by subjecting a linear polymer to a controlled process of modification which takes place by means of free radicals generated by peroxide initiators or by means of radiation. Examples of such processes and of the products obtained are described in American patents U.S. Pat. Nos. 4,916,198, 5,047,446 and 5,047,485, the descriptions of which are to be understood as included herein by way of reference. This branched polymer can preferably be mixed with (A) and (B) in amounts of between 5 and 20% by weight.

The compositions of the present invention may be prepared using technologies known in the art, such as the mechanical mixing of the two components (A) and (B), and optionally (C), using internal mixers with high mixing efficiency of the Banbury type, or by mixing them directly in the extruder.

If compositions (A') and (A") described above are used, they may be mixed separately to form the olefin composition (A) of the present invention. Preferably, the compositions (A') and (A") and the composition (B) are mixed together, in a mixer or directly in the extruder, to form the composition (A)+(B) of the present invention.

As described above, the compositions of the present invention are used in the process for the preparation of mono- or multilayer blown films, by which process films having improved mechanical properties are obtained. The said films may be prepared by the processes and with the related equipment generally used in the technique of blown films according to that which is known to those skilled in the art.

Obviously, the compositions of the present invention may contain additives capable of imparting specific properties to the articles which these compositions are intended to produce.

Additives which may be used are those conventionally used in thermoplastic polymer compositions such as, for example, stabilizers, antioxidants, anti-corrosion agents, antislip agents, antiblocking agents, etc.

The compositions of the invention may moreover contain inorganic or organic, including polymeric, fillers. The abovementioned additives and fillers may be used in conventional amounts, as is known by those skilled in the art or as may readily be determined by routine tests, generally in amounts up to 5% by weight of the final composition.

The optional additives do not modify the weight ranges described for the components of the present invention, which are to be understood as relative weight ratios between the components (A1), (A2), (B1), (B2) and optionally (C) or (A'1), (A'2), (A"1), (A"2), (B1), (B2) and optionally (C).

When used in the process for the preparation of blown films, the compositions of the present invention, although having a high propylene polymer content, are readily processable, a production efficiency (Kg/h) in line with that obtained using LDPE having been found under the same process conditions; in particular, it has been observed that the production efficiency is not less than 90% of that obtained with LDPE.

The blown films obtained with compositions (A)+(B) according to the present invention have improved mechanical properties when compared with polyethylene-based films. In particular, the said films are of improved impact strength when compared with LDPE/LLDPE films of greater thickness. Moreover, the films of the invention also possess improved properties in terms of tensile modulus and load at yield.

EXAMPLES

The properties indicated were determined according to the following methods:

Composition of the polymers: weight percentage of the various monomers determined by I.R.;

Insolubility in xylene: 2 g of polymer are dissolved in 250 cm$^3$ of xylene at 135° C. with stirring. After 20 minutes the solution is left to cool with continued stirring until it reaches a temperature of 25° C. After 30 minutes the insoluble polymer precipitated is separated out by filtration. The solvent is removed from the solution by evaporation under a stream of nitrogen and the residue is dried under vacuum at 80° C. until the weight remains constant. In this way, the percentage of polymer soluble in xylene at 25° C. is calculated and, consequently, the percentage of insoluble polymer is determined;

Melt strength: The method consists in measuring the strength of a "thread" of molten polymer, working at a specific drawing speed. The polymer is extruded at 200° C. through a circular slot with a diameter of 1 mm; the polymer is then drawn at a constant acceleration of 0.0012 cm/sec$^2$, with the resistance offered being measured using an instrument for measuring the strength of the molten material (Rheotens melt tension instrument model 2001 produced by Gottfert) which records the force as a function of drawing. The test is continued to the breaking point and the maximum value measured corresponds to the melt strength.

Heat of fusion: ASTM D 3418-82;

Density: ASTM D 1505;

Melt Index E (MIE): ASTM D 1238, condition E;

Melt Index F (MIF): ASTM D 1238, condition F;

Melt Index L (MIL): ASTM D 1238, condition L;

F/E: ratio between the Melt Index F and the Melt Index E;

Elmendorf Tear Strength: ASTM D 1922, determined both in the direction of the machine (MD) and in the transverse direction (TD);

Elongation at yield: ASTM D 882

Load at yield: ASTM D 882

Tensile modulus: ASTM D 882

Example 1

A blown film 100 μm in thickness was prepared using a line comprising a Dolci KR40 single-screw extruder with a Maddock homogenizer having the following characteristics: L/D=26; compression rate=1.5.

The composition used was made up of 50% of a composition (A) itself containing a composition (A') comprising:

(A'1) about 88% of a fraction which is insoluble in xylene, containing a propylene homopolymer with an isotactic index of greater than 90;

(A'2) about 12% of a fraction which is soluble in xylene, containing an ethylene/propylene copolymer containing about 50% ethylene;

and a composition (A") comprising:

(A"1) 37% of a fraction which is insoluble in xylene, containing a propylene/ethylene copolymer containing about 3% ethylene;

(A"2) about 63% of a fraction which is soluble in xylene, containing an ethylene/propylene copolymer containing about 30% ethylene; where the sum of (A'1) and (A"1) is equal to 39 parts by weight and the sum of (A'2) and (A"2) is equal to 11 parts by weight;

and 50% of the composition (B) comprising:
  (B1) about 85 parts by weight of an ethylene/butene copolymer (LLDPE);
  (B2) about 15 parts by weight of a terpolymer of propylene with ethylene and butene, having an insolubility in xylene of greater than 70%.

The extrusion conditions used were as follows: barrel temp. 190–220° C.; head temp. 225° C.; blowing ratio=2; extruder speed 50 rpm. Slot aperture 1.15 mm.

The results of the tests to which the film was subjected are given in Table 1.

Example 2

A blown film 100 μm in thickness was produced using the apparatus and the conditions described in Example 1. A composition was used having the same components as in Example 1 in the following ratios:
60% of the composition (A) comprising 48 parts by weight of (A'1)+(A"1) and 12 parts by weight of (A'2)+(A"2);
40% of the composition (B) as described in Example 1. The results of the tests to which the film was subjected are given in Table 1.

Example 3

A blown film 100 μm in thickness was produced using the apparatus and the conditions described in Example 1. A composition was used having the same components as in Example 1 in the following ratios:
70% of the composition (A) comprising 51 parts by weight of (A'1)+(A"1) and 19 parts by weight of (A'2)+(A"2);
30% of the composition (B) as described in Example 1. The results of the tests to which the film was subjected are given in Table 1.

Example 4

A blown film 100 μm in thickness was produced using the apparatus and the conditions described in Example 1. A composition was used consisting of 50% of the composition (A) comprising:
44 parts by weight of (A1) a fraction which is insoluble in xylene, containing a propylene homopolymer with an isotactic index of greater than 90; and
6 parts by weight of (A2) a fraction which is soluble in xylene, containing an ethylene/propylene copolymer containing about 5% ethylene;
and 50% of the composition (B) comprising (B1) and (B2) having compositions and weight ratios as described in Example 1. The results of the tests to which the film was subjected are given in Table 1.

Example 5

A blown film 100 μm in thickness was produced using the apparatus and the conditions described in Example 1. The following composition was used:
70% of the composition (A) comprising 56 parts by weight of (A'1)+(A"1) and 14 parts by weight of (A'2)+(A"2) having the same compositions as described in Example 1;
20% of the composition (B) as described in Example 1; and
10% of the component (C) comprising a propylene homopolymer with a branching number of 0.56, a melt strength of 23 cN and a melt index (MIL) of 5 dg/min. The results of the tests to which the film was subjected are given in Table 1.

Example 6 (Comparative)

A one-layer film 180 μm in thickness was obtained using a blend consisting of 80% LDPE and 20% C4-LLDPE. The results of the mechanical tests are given in Table 1.

Example 7 (Comparative)

A three-layer film 200 μm in thickness consisting of LDPE/LLDPE/LDPE, named Hot Filling and marketed by Borealis, was subjected to the mechanical tests as in the above examples. The results are given in Table 1.

TABLE 1

|  |  | Ex. 1 | Ex. 2 | Ex. 3 | Ex. 4 | Ex. 5 | Ex. 6 (comp.) | Ex. 7 (comp.) |
|---|---|---|---|---|---|---|---|---|
| MET tang |  |  |  |  |  |  |  |  |
| MD | MP | 370 | 480 | 510 | 540 | 750 | 210 | 300 |
| TD | at | 340 | 430 | 520 | 490 | 600 | 240 | 330 |
| Load at yield MD | MP | 13.8 | 17 | 16.9 | 18.7 | 21.8 | 10.7 | 12.1 |
| TD | at | 12 | 14.5 | 13.7 | 15.7 | 16.8 | 10.6 | 12.3 |
| Elongation at yield |  |  |  |  |  |  |  |  |
| MD | % | 35 | 32 | 37 | 30 | 25 | 21 | 18 |
| TD |  | 22 | 21 | 25 | 18 | 18 | 15 | 14 |
| Load at tear |  |  |  |  |  |  |  |  |
| MD | MP | 45 | 49 | 48 | 52 | 43 | 19 | 21 |
| TD | at | 38 | 39 | 38 | 39 | 34 | 18 | 14 |
| Elongation at tear |  |  |  |  |  |  |  |  |
| MD | % | 990 | 990 | 990 | 990 | 850 | 500 | 830 |
| TD |  | 1160 | 1110 | 1120 | 1100 | 1020 | 600 | 500 |
| Dart | g | 590 | 510 | 640 | 440 | 460 | 350 | 370 |

What is claimed is:

1. Polyolefin blown films comprising a composition obtained by mixing:
  (A) a heterogeneous polyolefin composition (A) comprising:
    (A1) from 30 to 85 parts by weight of a polymer which is insoluble in xylene at room temperature, comprising a propylene homopolymer or a copolymer of propylene with ethylene and/or another α-olefin $CH_2=CHR^I$, where $R^I$ is an alkyl radical having 2–10 carbon atoms, this polymer (A1) containing more than 85% by weight of propylene monomeric units; and (A2) from 10 to 40 parts by weight of a polymer which is soluble in xylene at room temperature, comprising an amorphous copolymer of ethylene with propylene and/or another α-olefin $CH_2=CHR^I$, where $R^I$ has the meaning described above, this polymer (A2) containing more than 15% by weight of ethylene monomeric units and optionally containing small proportions of a diene;

(B) a polyolefin composition (B) comprising:
(B1) from 80 to 95 parts by weight of a copolymer of ethylene with one or more α-olefins selected from the group consisting of 1-butene and 1-hexene, this ethylene copolymer (B1) having a density of between 0.89 and 0.94 g/cm³, a melt index of from 0.1 to 10 g/10', and containing up to 20 mol % of the α-olefin; and
(B2) from 5 to 20 parts by weight of a copolymer of propylene with ethylene and/or one or more α-olefins selected from the group consisting of 1-butene and 1-hexene, this propylene copolymer (B2) containing from 60 to 98% by weight of propylene and having an insolubility in xylene of greater than 70%; and (C) a propylene polymer with a branching number of less than 1; the amount of composition (A) being 60–90% by weight of the total amount of components (A) and (B), and the amount of component (C) being 1 to 30% by weight of the total amount of components (A) and (B).

2. The blown films of claim 1, wherein composition (A) is present in amounts ranging from 75 to 85% by weight relative to the total weight of composition (A) and composition (B).

3. The blown films of claim 1, wherein polymer (A1) comprises a propylene homopolymer or a copolymer of propylene, polymer (A1) containing more than 90% by weight of propylene monomeric units.

4. The blown films of claim 3, wherein polymer (A1) comprises a copolymer of propylene with ethylene.

5. The blown films of claim 3, wherein the amount of polymer (A1) in composition (A) is between 45 and 70 parts by weight.

6. The blown films of claim 1, wherein polymer (A2) comprises a copolymer of ethylene with propylene, and optionally contains small proportions of a diene, polymer (A2) containing more than 20% by weight of ethylene monomeric units.

7. The blown films of claim 6, wherein polymer (A2) has an intrinsic viscosity of between 1.5 and 4 dl/g.

8. The blown films according to claim 1, wherein copolymer (B1) has a density of between 0.90 and 0.935 g/cm³.

9. The blown films according to claim 1, wherein copolymer (B1) has a melt flow index of between 0.2 and 3 g/10'.

10. The blown films according to claim 1, wherein copolymer (B2) is a terpolymer of propylene with ethylene and the α-olefin.

11. The blown films according to claim 10, wherein the propylene content of the terpolymer is between 85 and 96% by weight, the ethylene content is between 2 and 8% by weight, and the α-olefin content is between 2 and 7% by weight.

12. The blown films according to claims 11, wherein the insolubility in xylene of copolymer (B2) is greater than 75%.

13. The blown films according to claim 12, wherein the insolubility in xylene of copolymer (B2) is greater than 85%.

14. The blown films of claim 1, wherein composition (A) is obtained by mixing:

(A') a first heterogeneous polyolefin composition comprising:
(A'1) 75–95% by weight of a polymer which is insoluble in xylene at room temperature, comprising a propylene homopolymer or a copolymer of propylene with ethylene and/or another α-olefin $CH_2=CHR^I$, where $R^I$ is an alkyl radical having 2–10 carbon atoms, this polymer (A'1) containing more than 85% by weight of propylene monomeric units; and
(A'2) from 5 to 25% by weight of a polymer which is soluble in xylene at room temperature, comprising an amorphous copolymer of ethylene with propylene and/or another α-olefin $CH_2=CHR^I$, where $R^I$ has the meaning described above, this polymer (A2) containing more than 15% by weight of ethylene monomeric units and optionally containing small proportions of a diene; and (A") a second heterogeneous polyolefin composition comprising:
(A"1) from 30 to 75% by weight of a polymer which is insoluble in xylene at room temperature, comprising a propylene homopolymer or a copolymer of propylene with ethylene and/or another α-olefin $CH_2=CHR^I$, where $R^I$ is an alkyl radical having 2–10 carbon atoms, this polymer (A"1) containing more than 85% by weight of propylene monomeric units; and
(A"2) from 25 to 70% by weight of a polymer which is soluble in xylene at room temperature, comprising an amorphous copolymer of ethylene with propylene and/or another α-olefin $CH_2=CHR^I$, where $R^I$ has the meaning described above, this polymer (A"2) containing more than 15% by weight of ethylene monomeric units and optionally containing small proportions of a diene;

the total of (A'1) and (A"1) being between 30 and 85 parts by weights the total of (A'2) and (A"2) being between 10 and 40 parts by weight.

15. The blown films according to claim 14, wherein polymer (A"2) contains between 15 and 40% by weight of ethylene monomeric units.

16. The blown films according to claim 1, wherein component (C) is a propylene polymer having a branching number of between 0.1 and 0.9.

17. The blown films according to claim 1, wherein component (C) is a propylene polymer having a branching number of between 0.2 and 0.7.

18. The blown films according to claim 1, wherein component (C) has a melt strength of between 5 and 40 cN.

19. The blown films according to claim 18, wherein component (C) has a melt strength of between 10 and 35 cN.

20. The blown films according to claim 18, wherein component (C) has a melt strength of between 15 and 30 cN.

21. A process for the production of polyolefin blown films comprising forming a film from a composition obtained by mixing and extruding:

(A) a heterogeneous polyolefin composition (A) comprising:
(A1) from 30 to 85 parts weight of a polymer which is insoluble in xylene at room temperature, comprising a propylene homopolymer or a copolymer of propylene with ethylene and/or another α-olefin $CH_2=CHR^I$, where $R^I$ is an alkyl radical having 2–10 carbon atoms, this polymer (A1) containing more than 85% by weight of propylene monomeric units; and
(A2) from 10 to 40 parts by weight of a polymer which is soluble in xylene at room temperature, comprising an amorphous copolymer of ethylene with propylene and/or another α-olefin $CH_2=CHR^I$, where $R^I$ has the meaning described above, this polymer (A2) containing more than 15% by weight of ethylene monomeric units and optionally containing small proportions of a diene;

(B) a polyolefin composition (B) comprising:

(B1) from 80 to 95 parts by weight of a copolymer of ethylene with one or more α-olefins selected from the group consisting of 1-butene and 1-hexene, this ethylene copolymer (B1) having a density of between 0.89 and 0.94 g/cm³, a melt index of from 0.1 to 10 g/10', and containing up to 20 mol % of the α-olefin; and (B2) from 5 to 20 parts by weight of a copolymer of propylene with ethylene and/or one or more α-olefins selected from the group consisting of 1-butene and 1-hexene, this propylene copolymer (B2) containing from 60 to 98% by weight of propylene and having an insolubility in xylene of greater than 70%; and (C) a propylene polymer with a branching number of less than 1; the amount of composition (A) being 60–90% by weight of the total amount of components (A) and (B), and the amount of component (C) being 1 to 30% by weight of the total amount of components (A) and (B), the extruding step being carried out at a barrel temperature from 190° C. to 220° C.

* * * * *